UNITED STATES PATENT OFFICE 2,073,100

N-AMINOALKYLAMIDES OF N-ALKYL-AMINOBENZOIC ACIDS AND PROCESS OF PREPARING THEM

Otto Eisleb, Hofheim in Taunus, Germany, assignor to Winthrop Chemical Company, Inc., New York, N. Y., a corporation of New York No Drawing. Application July 20, 1935, Serial No. 32,469. In Germany July 26, 1934

5 Claims. (Cl. 260—43)

The present invention relates to N-aminoalkylamides, more particularly to N-aminoalkylamides of N-alkylaminobenzoic acids and to a process of preparing them.

I have found that N-aminoalkylamides of N-alkylaminobenzoic acids may be produced by converting N-monoalkylaminobenzoic acids with the aid of unsymmetrically substituted alkylenediamines into basic amides. This transformation may be carried out according to the usual methods by causing an unsymmetrically substituted alkylenediamine to act upon the N-monoalkylaminobenzoic acids, the halides thereof or esters. As such unsymmetrically substituted alkylenediamines there may be used, for instance, 1-amino-2-diethylamino-ethane or 1-amino-3-piperidino-ethane.

The products obtained in this manner have the following general formula:

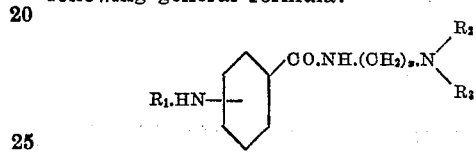

wherein $R_1$ stands for alkyl, $R_2$ and $R_3$ each stand for alkyl or $R_2$ and $R_3$ together stand for the grouping

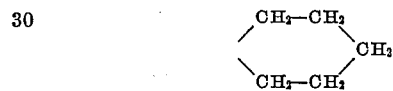

and $x$ stands for 2 or a whole number greater than 2.

The compounds form colorless to weakly yellowish water-insoluble oils which, in the form of their salts, are water-soluble. The compounds are excellent local anaesthetics. Their toxicity is considerably smaller than that of the known basic amides of the heterocyclic series.

The following examples serve to illustrate the invention, but they are not intended to limit it thereto, the parts being by weight, unless otherwise stated:

(1) *4-butylamino-benzoic acid-beta-diethylaminoethylamide*

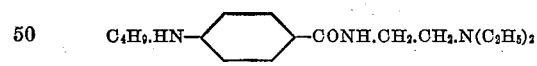

The hydrochloride of 4-butylaminobenzoylchloride is made from 4-butylaminobenzoic acid by triturating the latter with phosphorous pentachloride, suspended in benzene at room temperature during 6 hours in a ball mill in the form of a colorless powder which is quite insoluble in benzene. Into a mixture of 25 parts of 1-amino-4-diethylaminoethane and 100 parts of benzene there are introduced 25 parts of the hydrochloride of 4-butylaminobenzoylchloride. A clear solution is obtained which is subsequently heated for 30 minutes in a reflux apparatus on the water bath. After cooling the solution is first shaken with a dilute sodium carbonate solution containing 11 parts of dry sodium carbonate and then several times with water. The benzene liquid is afterwards shaken with such an amount of 2/1 n-hydrochloric acid as is necessary for obtaining an aqueous solution just neutral to litmus paper; this solution yields, when separated and evaporated on the water bath, the monohydrochloride of 4-butylaminobenzoic acid-beta-diethylaminoethylamide in a solid form. After recrystallization from a mixture of methyl alcohol and acetone colorless crystals are formed of M. P.= 140° C. to 141° C. which are very readily soluble in water. The free base is oily.

(2) *4-ethylaminobenzoic acid-beta-diethylaminoethylamide*

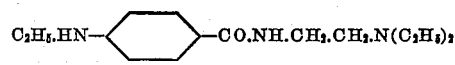

10 parts of 4-ethylaminobenzoic acid-methylester and 20 parts of 1-amino-2-diethylaminoethane are heated together in a distilling flask so that the temperature of the liquid becomes 155° C. to 160° C. The methyl alcohol which separates very slowly distils. After 15 hours the product is taken up in such an amount of dilute hydrochloric acid that the reaction is neutral to litmus paper. Methyl ester which may still be present in a small amount remains undissolved and is filtered with suction. On addition of sodium carbonate solution the basic amide is precipitated from the filtrate in the form of a thick oil. It is taken up in ether, the ethereal layer separated and the base transformed into phosphate by means of phosphoric acid. The phosphate is a crystalline colorless powder which, when recrystallized from methyl alcohol, melts at a temperature between 209° C. and 211° C. with evolution of gas.

(3) *N-propyl-anthranilic acid-beta-diethylaminoethylamide*

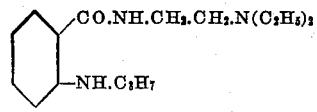

18 parts of N-propyl-anthranilic acid are caused to react in 50 parts of benzene with 23 parts of phosphorus pentachloride, while moderately cooling, in such a manner that the temperature does not rise above 35° C. The clear solution obtained is mixed with 100 parts of benzine whereby the chloride is precipitated in the form of a viscous oil it is purified as far as possible, by decanting and washing it with benzine and then dissolved in 200 parts of benzene. After addition of 24 parts of 1-amino-2-diethyl-amino-ethane the whole is heated for one hour on the water-bath. By the addition of an excess of sodium carbonate solution the basic amide is then set free. The separated benzene solution contained in the basic amide is twice shaken with water; by shaking with dilute phosphoric acid, which contains 9.8 parts of $H_3PO_4$ an aqueous solution of the phosphate is then produced which, after concentration and mixing with acetone, is obtained in the form of a colorless crystalline powder. The phosphate melts, when recrystallized from alcohol, at 190° C.

*(4) N-hexyl-anthranilic acid-beta-diethyl-aminoethylamide*

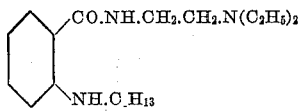

N-hexyl-anthranilic acid-ethylester is obtained by the reaction of 2 molecular proportions of anthranilic acid ethyl ester with 1 molecular proportion of hexylbromide by heating them together for 3 hours to 135° C. After cooling the crystalline magma is shaken with ether and sodium carbonate solution; after drying over potassium carbonate the separated ethereal solution is fractionated in the vacuum; the ester boils under a pressure of 7 mm. between 170° C. and 175° C. The ester is an oil; the N-hexyl-anthranilic acid obtained therefrom by saponification melts at a temperature between 65° C. and 66° C. and forms, when re-crystallized from benzine, thick weakly yellowish prisms.

Equal parts of N-hexyl-anthranilic acid-ethylester and 1-amino-2-diethylamino-ethane are kept in a distilling flask for 30 hours at an internal temperature of 200° C., whereby the ethyl alcohol formed is distilled. During the subsequent distillation in a vacuum there is obtained the basic amide in the form of a thick oil which distils at a temperature of about 230° C. under a pressure of 5 mm. The phosphate, when recrystallized from alcohol, melts at 172 C.

*(5) 3-butylamino-benzoic acid-beta-diethyl-aminoethylamide*

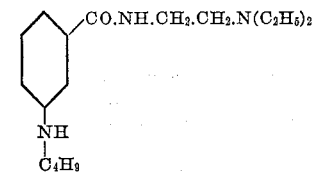

55 parts of 3-amino-benzoic acid are dissolved in 200 parts by volume of 2/1 n-caustic soda solution and the solution is stirred during 5 hours with 60 parts of n-butyl-bromide at 100° C. in a reflux apparatus. 200 parts by volume of 2/1 n-caustic soda solution are then added; steam is passed through the solution for a short time until odor of butylbromide is no longer perceptible; the 3-butylamino-benzoic acid is then precipitated by adding 200 parts by volume of 2/1 n-hydrochloric acid and 50 parts by volume of 2/1 n-acetic acid. The oily precipitate is taken up in ether, the ethereal layer separated, and ether distilled, finally in a vacuum; about 60 parts of acid remain in the form of a viscous brown oil which is mixed with 46 parts of 1-amino-2-diethylamino-ethane and heated for about 6 hours in a distilling flask to a temperature between 180° C. and 200° C., the water produced being distilled; the formation of the basic amide is almost quantitative. The basic amide boils under a pressure of 7 mm. at a temperature between 250° C. and 252° C. and forms a weakly yellowish oil. On addition of sirupy phosphoric acid the phosphate separates from the acetone solution of the base in the form of a colorless crystalline powder. It melts, when recrystallized from isopropyl alcohol, at 146° C.

*(6) 4-butylamino-benzioc acid-beta-piperidino-ethyl amide*

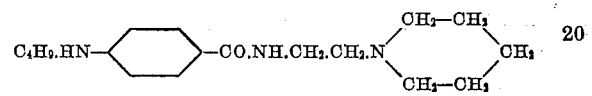

Into a mixture of 28 parts of 1-amino-2-piperidino-ethane (boiling point: 185° C. to 190° C.) and 100 parts of benzene 25 parts of the hydrochloride of 4-butylaminobenzoyl chloride are introduced. The mixture is boiled for 2 hours in a reflux apparatus on the water-bath; an excess of sodium carbonate solution is then added, the benzene solution is separated after agitating, and twice shaken with water; the benzene is then distilled. The residue is taken up in acetone; the phosphate precipitates on addition of sirupy phosphoric acid in the form of a colorless finely crystalline powder; it melts, when recrystallized from methyl alcohol, at a temperature between 184° C. and 185° C.

I claim:

1. As new products the compounds of the following formula:

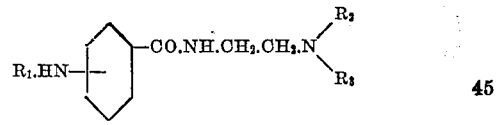

wherein $R_1$ stands for alkyl and $R_2$ and $R_3$ stand for a member of the group consisting of alkyl and the cyclic grouping

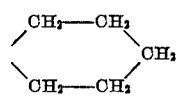

being colorless to weakly yellowish water-insoluble oils which in the form of their salts are water-soluble.

2. As new products the compounds of the following formula:

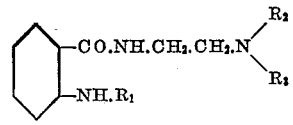

wherein $R_1$ stands for alkyl and $R_2$ and $R_3$ stand for a member of the group consisting of alkyl and the cyclic grouping

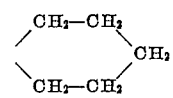

being colorless to weakly yellowish water-insoluble oils which in the form of their salts are water-soluble.

3. As a new product the compound of the following formula:

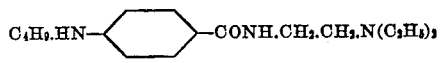

being a colorless to weakly yellowish water-insoluble oil which in the form of its salts is water-soluble.

4. As a new product the compound of the following formula:

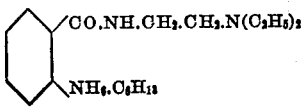

being a colorless to weakly yellowish water-insoluble oil which in the form of its salts is water-soluble.

5. As a new product the compound of the following formula:

being a colorless to weakly yellowish water-insoluble oil which in the form of its salts is water-soluble.

OTTO EISLEB.